United States Patent
Lee et al.

(10) Patent No.: US 10,929,314 B2
(45) Date of Patent: Feb. 23, 2021

(54) INTERFACE DEVICES, METHODS FOR CONTROLLING AN INTERFACE DEVICE, AND COMPUTER-READABLE MEDIA

(71) Applicant: RAZER (ASIA-PACIFIC) PTE. LTD., Singapore (SG)

(72) Inventors: Kah Yong Lee, Singapore (SG); Chee Oei Chan, Singapore (SG)

(73) Assignee: RAZER (ASIA-PACIFIC) PTE. LTD., Singapore (SG)

(*) Notice: Subject to any disclaimer, the term of this patent is extended or adjusted under 35 U.S.C. 154(b) by 0 days.

(21) Appl. No.: 16/319,307

(22) PCT Filed: Jul. 29, 2016

(86) PCT No.: PCT/SG2016/050367
§ 371 (c)(1),
(2) Date: Jan. 18, 2019

(87) PCT Pub. No.: WO2018/021961
PCT Pub. Date: Feb. 1, 2018

(65) Prior Publication Data
US 2019/0286579 A1    Sep. 19, 2019

(51) Int. Cl.
*G06F 13/10*    (2006.01)
*G06F 13/38*    (2006.01)
(Continued)

(52) U.S. Cl.
CPC ............ *G06F 13/102* (2013.01); *G06F 13/38* (2013.01); *G06F 13/385* (2013.01);
(Continued)

(58) Field of Classification Search
CPC ...... G06F 13/102; G06F 13/38; G06F 13/385; G06F 13/4282; G06F 3/033; G06F 2213/0042
(Continued)

(56) References Cited

U.S. PATENT DOCUMENTS

| 4,258,433 A | * | 3/1981 | Herschtal ................ H04L 12/00 178/3 |
| 4,287,593 A | * | 9/1981 | Stover ................... H04J 3/0629 370/507 |

(Continued)

FOREIGN PATENT DOCUMENTS

| CN | 102012883 A | 4/2011 |
| CN | 102012883 B | 9/2012 |

(Continued)

OTHER PUBLICATIONS

Extended European Search Report, dated Jun. 7, 2019, for the corresponding European Application No. 16910670.5 in 9 pages.
(Continued)

*Primary Examiner* — Idriss N Alrobaye
*Assistant Examiner* — Henry W Yu
(74) *Attorney, Agent, or Firm* — Polsinelli PC (57) ABSTRACT

According to various embodiments, an interface device may be provided. The interface device may include: an interface to a host computer; a wireless interface to a peripheral device; a difference determination circuit configured to determine a difference between timeslots in the host computer and time slots in the peripheral device; and a notification circuit configured to notify the peripheral device about the difference if the determined difference is larger than a pre-determined threshold.

20 Claims, 5 Drawing Sheets

(51) Int. Cl.
*G06F 13/42* (2006.01)
*G06F 3/033* (2013.01)

(52) U.S. Cl.
CPC .......... *G06F 13/4282* (2013.01); *G06F 3/033* (2013.01); *G06F 2213/0042* (2013.01)

(58) Field of Classification Search
USPC ................ 710/5–6, 15, 29, 45, 58, 117, 124
See application file for complete search history.

(56) References Cited

U.S. PATENT DOCUMENTS

| | | | |
|---|---|---|---|
| 5,432,791 A * | 7/1995 | Gancarcik | H04J 3/0685 370/358 |
| 6,175,604 B1 * | 1/2001 | Noro | H04N 21/4305 348/518 |
| 6,587,694 B1 | 7/2003 | Mooney et al. | |
| 6,792,247 B2 | 9/2004 | Law et al. | |
| 7,167,975 B2 | 1/2007 | Hamdi et al. | |
| 7,254,159 B1 | 8/2007 | Lavelle et al. | |
| 7,321,755 B2 | 1/2008 | Hulvey | |
| 7,626,576 B2 | 12/2009 | Anandakumar et al. | |
| 7,664,204 B1 * | 2/2010 | Wang | H04L 27/0014 375/326 |
| 7,809,973 B2 | 10/2010 | Sartore et al. | |
| 8,546,706 B2 | 10/2013 | Altman et al. | |
| 8,571,005 B1 | 10/2013 | Vleugels et al. | |
| 8,604,365 B2 | 12/2013 | Altman et al. | |
| 9,170,981 B2 * | 10/2015 | Jensen | H04L 7/02 |
| 9,830,298 B2 * | 11/2017 | Tsfaty | G06F 13/4286 |
| 2002/0007465 A1 * | 1/2002 | Dive | G06F 1/12 713/400 |
| 2003/0043771 A1 * | 3/2003 | Mizutani | H04W 76/10 370/338 |
| 2005/0089127 A1 * | 4/2005 | Nagaraja | H04L 27/2657 375/354 |
| 2011/0289238 A1 * | 11/2011 | Holbein | H04W 4/00 710/10 |
| 2013/0237270 A1 * | 9/2013 | Suumaki | H04M 1/7253 455/517 |
| 2014/0101347 A1 * | 4/2014 | Chandhoke | G06F 13/404 710/26 |
| 2014/0237162 A1 * | 8/2014 | Brewer | G06F 3/0613 711/103 |
| 2015/0062013 A1 | 3/2015 | Solomon et al. | |
| 2015/0092642 A1 | 4/2015 | Geboff et al. | |
| 2016/0357217 A1 * | 12/2016 | Ramsey | G06F 1/12 |

FOREIGN PATENT DOCUMENTS

| | | |
|---|---|---|
| EP | 2312776 A1 | 4/2011 |
| KR | 10-2009-0095002 A | 9/2009 |
| TW | 201110603 A | 3/2011 |

OTHER PUBLICATIONS

Hyuntae Cho, et al., "Implementation of a Precision Time Protocol Over Low Rate Wireless Personal Area Networks", Department of Computer Engineering, Pusan National University, 2018, 8 pages.

International Search Report and Written Opinion, dated Apr. 26, 2017, for the corresponding International Application No. PCT/SG2016/050367 in 8 pages.

Fengyuan Bai, "Clock Synchronization in Android Wi-Fi Direct Network", University of Gothenburg, Chalmers University of Technology, Department of Computer Science and Engineering, Goteborg, Sweden, Bachelor of Science Thesis in the Programme Software Engineering & Management, Aug. 2014, https://gupea.ub.gu.se/bitstream/2077/38584/1/gupea_2077_38584_1.pdf, in 20 pages.

* cited by examiner

INTERFACE DEVICES, METHODS FOR CONTROLLING AN INTERFACE DEVICE, AND COMPUTER-READABLE MEDIA

TECHNICAL Field

Various embodiments generally relate to interface devices, methods for controlling an interface device, and computer-readable media.

BACKGROUND

Most of the cordless mice in the market are not able to achieve true 1000 Hz polling rate. As such, there may be a need for devices and methods to facilitate achieving true 1000 Hz polling rate.

SUMMARY OF THE INVENTION

According to various embodiments, an interface device may be provided. The interface device may include: an interface to a host computer; a wireless interface to a peripheral device; a difference determination circuit configured to determine a difference between timeslots in the host computer and time slots in the peripheral device; and a notification circuit configured to notify the peripheral device about the difference if the determined difference is larger than a pre-determined threshold. According to various embodiments, the threshold may be determined by the resolution of a computing circuit (and for example not by the host computer). A good computing circuit (for example the interface device, for example a universal serial bus (USB) dongle, which may be connected to the host computer, for example via the interface) may get better than 1 ppm resolution, and for practical purposes, the threshold may be in a range of 10 ppm to 100 ppm.

According to various embodiments, a method for controlling an interface device may be provided. The method may include: providing an interface to a host computer; providing a wireless interface to a peripheral device; determining a difference between timeslots in the host computer and time slots in the peripheral device; and notifying the peripheral device about the difference if the determined difference is larger than a pre-determined threshold.

According to various embodiments, a computer-readable medium may be provided. The computer-readable medium may include instructions which, when executed by a computer, make the computer perform a method for controlling an interface device. The method may include: providing an interface to a host computer; providing a wireless interface to a peripheral device; determining a difference between timeslots in the host computer and time slots in the peripheral device; and notifying the peripheral device about the difference if the determined difference is larger than a pre-determined threshold.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In this context, the interface device as described in this description may include a memory which is for example used in the processing carried out in the interface device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

Most of the cordless mice in the market are not able to achieve true 1000 Hz polling rate (in other words: USB (universal serial bus) frequency).

In commonly used mice, there may be an offset between the operating clock frequency between the host system and the cordless mouse which includes all forms of wireless mouse or mouse operating without any cables to the host system.

According to various embodiments, this clock offset issue is resolved using an innovative and power efficient method. This may allow achieving a true 1000 Hz polling rate.

A commonly used system setup includes a host computer, a receiver and a cordless transmitter (for example provided in a computer mouse). The receiver may be attached to the host computer via a USB connector. The transmitter may send the mouse movement and buttons status commands wirelessly to the receiver and the receiver may send the mouse commands to the host system.

In commonly used systems, the host system, receiver and the transmitter each use an independent crystal clock to drive their respective functions. The user may set a polling frequency on the transmitter (for example on the cordless mouse) and the mouse may sample the data based on its own clock frequency. The sampled data may be sent to the receiver based on the transmitter operating frequency. The receiver may buffer the received data from the transmitter and wait for the host system to read the data. The host system may have its own clock frequency, and the data may be read based on the host system clock frequency.

Overflow and underflow of data may happen since the transmitter is not synchronized with the host system. The allowable USB frequency offset for a host system may be +/−500 ppm, which translates to 1 sample overflow/underflow for every 2 seconds under the worst case scenario. This means that a typical wireless mouse may never achieve a steady polling frequency claimed versus a wired mouse where data is polled by host computer directly.

A commonly used way of achieving tracking of clock frequency from a host computer may be using a Phase Lock Loop circuit at the mouse transmitter side which may constantly adjust clock jitter and drift. However, this implementation may consume much higher power, because the mouse transmitter may have to constantly have the wireless circuit turned on to track the host computer USB synchronization clock typically the SOF (Start of Frame) signal.

According to various embodiments, devices and methods are provided to resolve this deficiency of currently used cordless mouse design. Various embodiments may reduce power and may thus provide a low power mode concept.

According to various embodiments, systems and methods to synchronize cordless mouse transmission clock with computer USB clock may be provided.

Figure 1A:
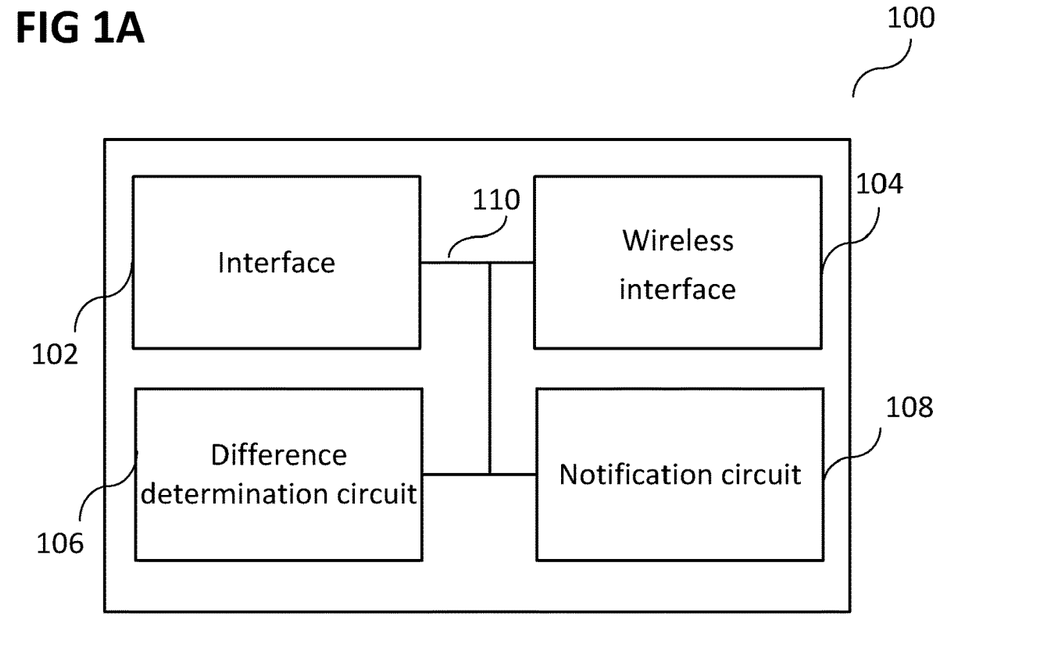
FIG. 1A shows an interface device according to various embodiments.

FIG. 1A shows an interface device 100 according to various embodiments. The interface device 100 may include an interface 102 (for example a first interface; for example a wired interface; for example a host computer interface) to a host computer (not shown in FIG. 1A). The interface device 100 may further include a wireless interface 104 to a peripheral device (not shown in FIG. 1A). The interface device 100 may further include a difference determination circuit 106 configured to determine a difference between timeslots (for example a clock signal) in the host computer and time slots (for example a clock signal) in the peripheral device. The interface device 100 may further include a notification circuit 108 configured to notify the peripheral device about the difference if the determined difference is larger than a pre-determined threshold. The interface 102, the wireless interface 104, the difference determination circuit 106, and the notification circuit 108 may be coupled with each other, like indicated by lines 110, for example electrically coupled, for example using a line or a cable, and/or mechanically coupled.

In other words, the interface device 100 may monitor timeslots (or clock shifts) between the host computer and the peripheral device, and may inform the peripheral device about a difference in timeslots (or about at clock shift), so that the peripheral device can update its internal clock accordingly.

According to various embodiments, the interface 102 may include or may be or may be included in a universal serial bus interface.

According to various embodiments, the difference determination circuit 106 may further be configured to determine the difference upon a power up of the interface device 100.

According to various embodiments, the notification circuit 108 may be configured to notify the peripheral device about the difference upon a power up of the interface device 100.

According to various embodiments, the pre-determined threshold may be based on the timeslots in the host computer.

According to various embodiments, the pre-determined threshold may be based on the timeslots in the peripheral device.

According to various embodiments, the pre-determined threshold may be in a range of 10 ppm to 50 ppm.

According to various embodiments, the difference determination circuit 106 may be configured to determine the difference based on a start of frame signal.

According to various embodiments, the interface device 100 may include or may be or may be included in a universal serial bus dongle.

According to various embodiments, the peripheral device may include or may be or may be included in a cordless mouse.

Figure 1B:
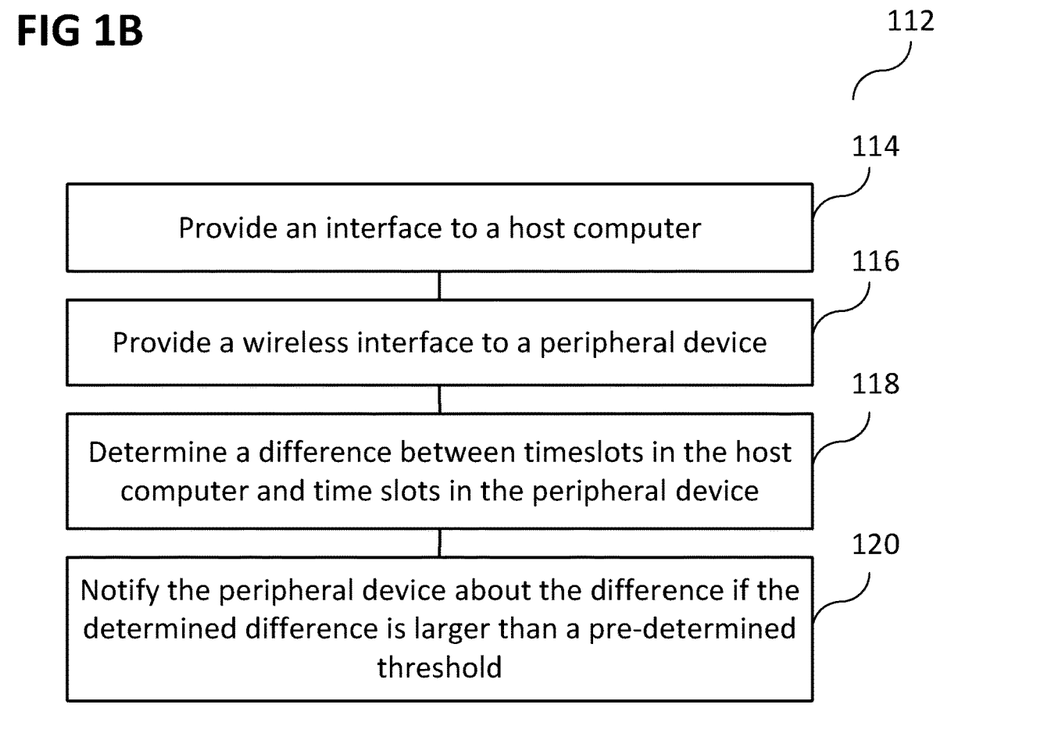
FIG. 1B shows a flow diagram illustrating a method for controlling an interface device according to various embodiments.

FIG. 1B shows a flow diagram 112 illustrating a method for controlling an interface device according to various embodiments. In 114, an interface to a host computer may be provided. In 116, a wireless interface to a peripheral device may be provided. In 118, a difference between timeslots in the host computer and time slots in the peripheral device may be determined. In 120, the peripheral device may be notified about the difference if the determined difference is larger than a pre-determined threshold.

According to various embodiments, the interface may include or may be or may be included in a universal serial bus interface.

According to various embodiments, the difference may be determined upon a power up of the interface device.

According to various embodiments, the method may further include notifying the peripheral device about the difference upon a power up of the interface device.

According to various embodiments, the pre-determined threshold may be based on the timeslots in the host computer.

According to various embodiments, the pre-determined threshold may be based on the timeslots in the peripheral device.

According to various embodiments, the pre-determined threshold may be in a range of 10 ppm to 50 ppm.

According to various embodiments, the difference may be determined based on a start of frame signal (for example of a USB protocol).

According to various embodiments, the interface device may include or may be or may be included in a universal serial bus dongle.

According to various embodiments, the peripheral device may include or may be or may be included in a cordless mouse.

According to various embodiments, a computer-readable medium may be provided. The computer-readable medium may include instructions which, when executed by a computer, make the computer perform a method for controlling an interface device. The method may include: providing an interface to a host computer; providing a wireless interface to a peripheral device; determining a difference between timeslots in the host computer and time slots in the peripheral device; and notifying the peripheral device about the difference if the determined difference is larger than a pre-determined threshold.

According to various embodiments, the interface may include or may be or may be included in a universal serial bus interface.

According to various embodiments, the difference may be determined upon a power up of the interface device.

According to various embodiments, the method may further include notifying the peripheral device about the difference upon a power up of the interface device.

According to various embodiments, the pre-determined threshold may be based on the timeslots in the host computer.

According to various embodiments, the pre-determined threshold may be based on the timeslots in the peripheral device.

According to various embodiments, the pre-determined threshold may be in a range of 10 ppm to 50 ppm.

According to various embodiments, the difference may be determined based on a start of frame signal.

According to various embodiments, the interface device may include or may be or may be included in a universal serial bus dongle.

According to various embodiments, the peripheral device may include or may be or may be included in a cordless mouse.

Figure 2:
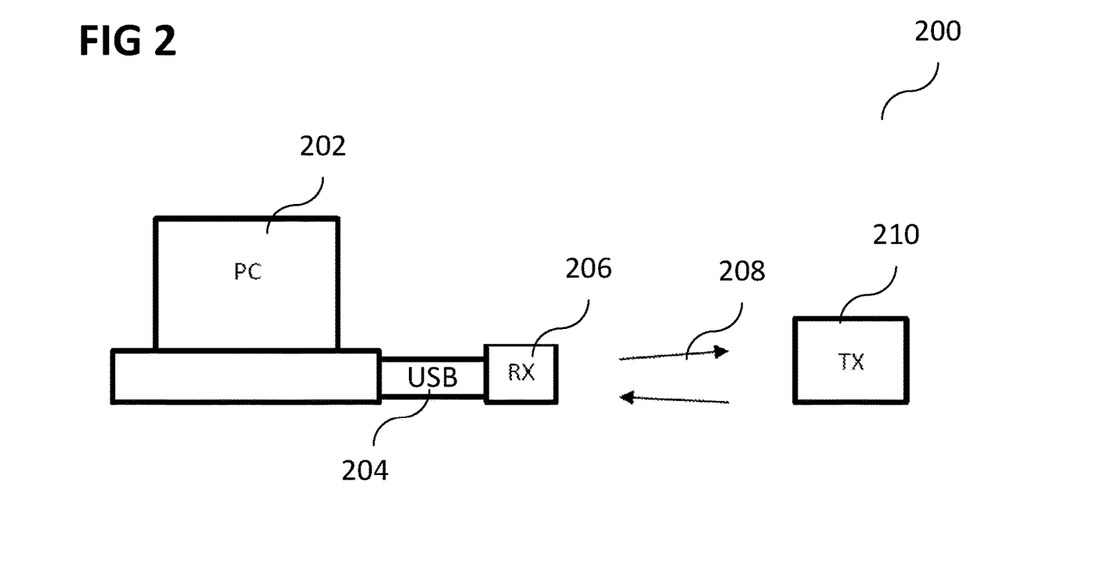
FIG. 2 shows a computing system according to various embodiments.

FIG. 2 shows a computing system 200 according to various embodiments. The computing system 200 may include a host computer 202, a receiver 206 and a cordless transmitter 210 (for example provided in a computer mouse). The receiver 206 may be attached to the host computer 202 via a USB connector 204. The transmitter 210 may send the mouse movement and buttons status commands wirelessly (like indicated by arrows 208) to the receiver 206, and the receiver 206 may send the mouse commands to the host system 210 via the USB connector 204.

According to various embodiments, a power efficient method may be provided to synchronize the transmitter (cordless mouse) polling rate to the computer USB clock frequency.

According to various embodiments, three methods may be provided to track the computer clock and transmitter clock:

In a first method, the clock offset between the host computer and the receiver may be computed upon power up. The first method may be referred to as USB clock offset tracking.

In a second method, the computer clock may be tracked during active operation. The second method may be referred to as active tracking.

In a third method, the transmitter clock may be tracked during active operation. The third method may be referred to as TX (transmitter) tracking.

Figure 3:
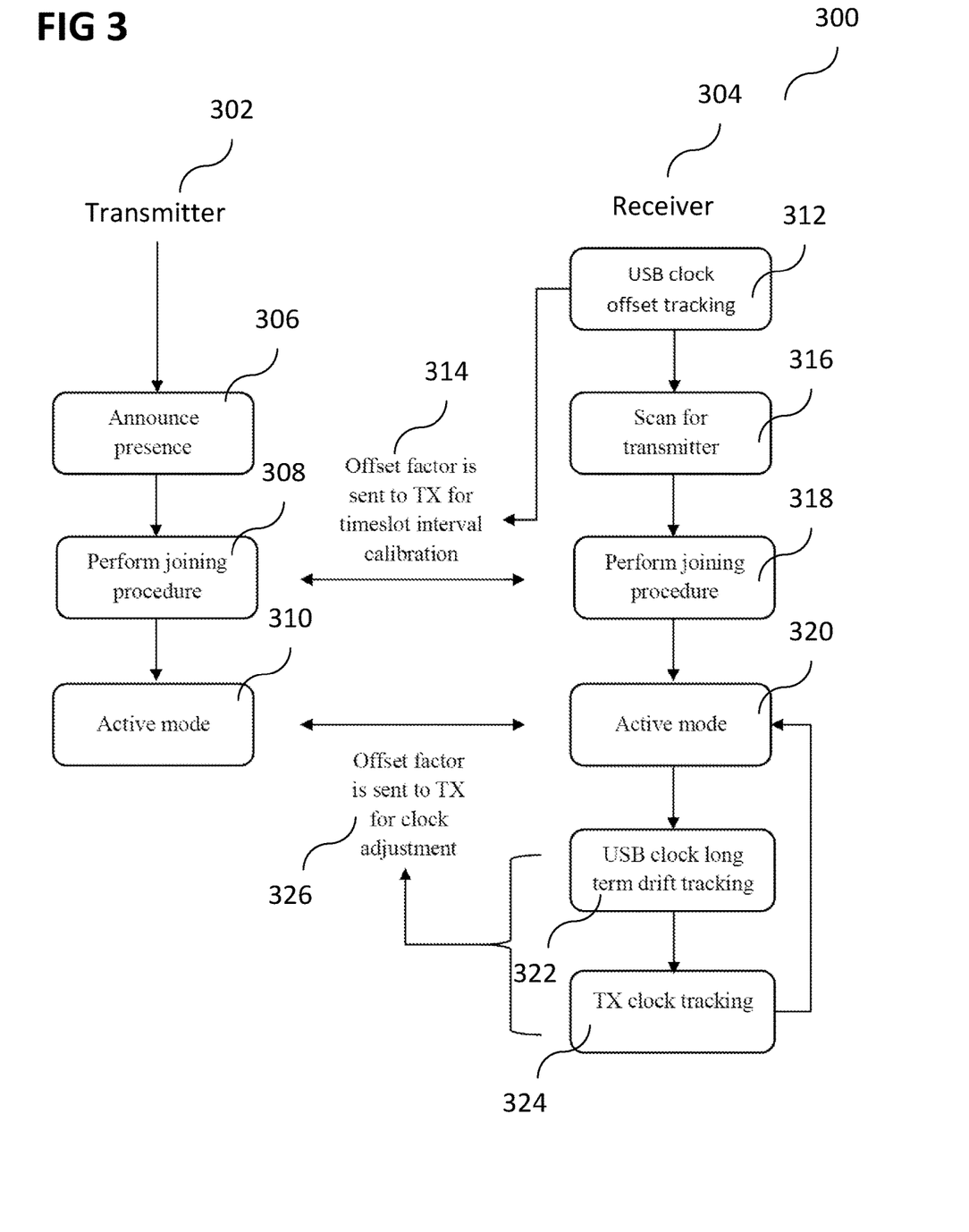
FIG. 3 shows a flow diagram illustrating processing in and communication between the transmitter and the receiver according to various embodiments, wherein the transmitter may be (or may be provided in) a wireless mouse, and wherein the receiver is a dongle interface to USB port.

FIG. 3 shows a flow diagram 300 illustrating processing in and communication between the transmitter and the receiver according to various embodiments. Processing in the transmitter is indicated on the left side 302 of FIG. 3. Processing in the receiver is indicated on the right side 304 of FIG. 3. In 312, the receiver may perform USB clock offset tracking. In 306, the transmitter may announce its presence. In 316, the receiver may scan for a transmitter. As a result of USB clock offset tracking (as carried out in 312), an offset factor may (in 314) be sent to the transmitter (TX) for timeslot interval calibration. In 308, the transmitter may perform a joining procedure. In 318, the receiver may perform a joining procedure. In 310, the transmitter may be in active mode. In 320, the receiver may be in active mode. In 322, the receiver may perform USB clock long term drift tracking. In 324, the receiver may perform TX clock tracking. As a result of USB clock long term drift tracking and TX clock tracking, the receiver may in 326 send an offset factor to the transmitter for clock adjustment.

Figure 4:
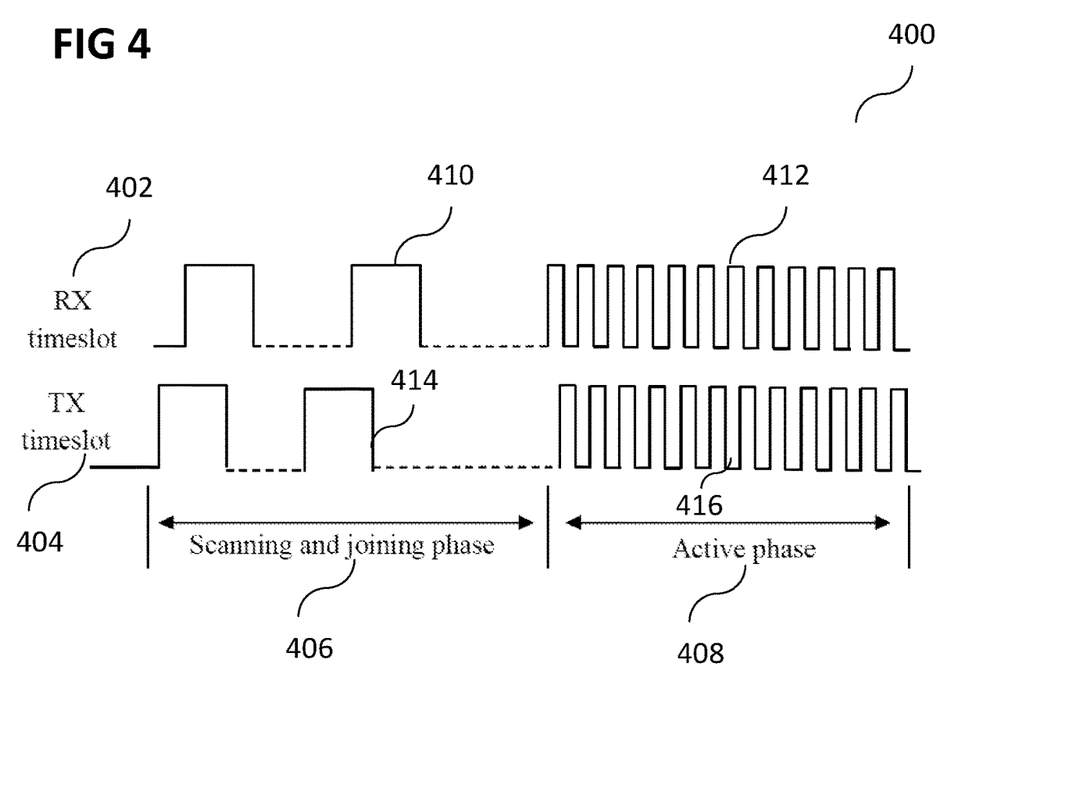
FIG. 4 shows an illustration of clock signals according to various embodiments.

FIG. 4 shows an illustration 400 of clock signals according to various embodiments. The "heartbeat" of the receiver and of the transmitter is the respective periodic timeslot (in other words the respective clock signal). The timeslot (or clock signal) may drive the functions and states of receiver (for example USB dongle) and of the transmitter (for example provided in a wireless mouse). RX timeslots 402 and TX timeslots 404 are shown. RX timeslots 410 during scanning and joining phase 406 may be longer than RX timeslots 412 during active phase 408. TX timeslots 414 during scanning and joining phase 406 may be longer than TX timeslots 416 during active phase 408.

Figure 5:
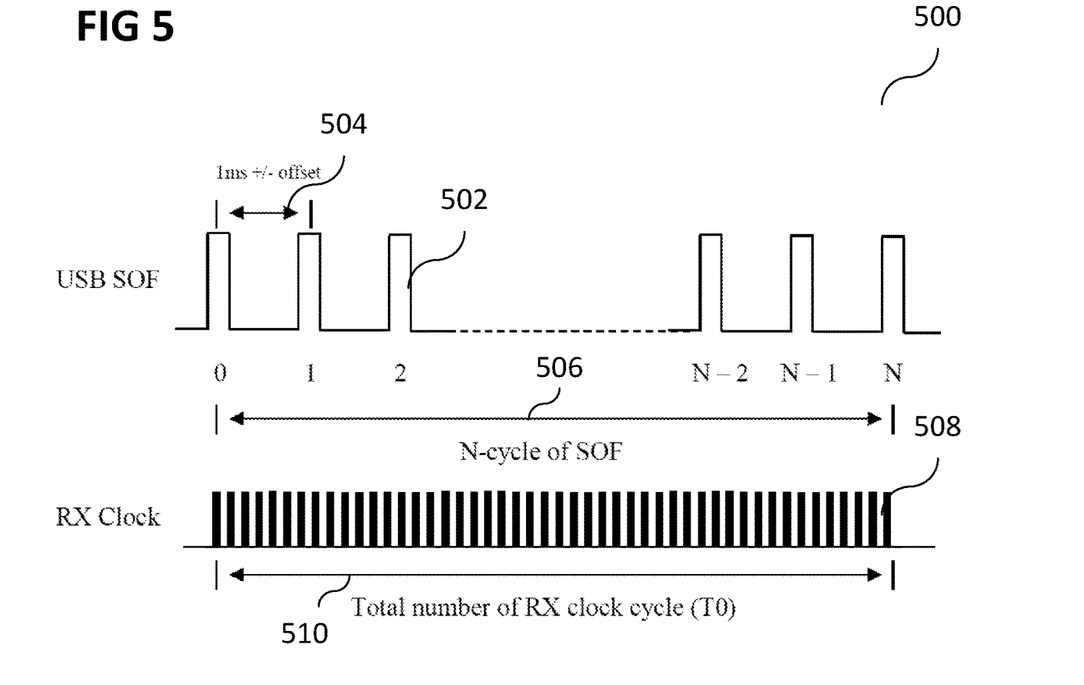
FIG. 5 shows an illustration of computing the computer clock offset against the receiver clock offset according to various embodiments.

FIG. 5 shows an illustration 500 of computing the computer clock offset against the receiver clock offset according to various embodiments. A plurality of USB SOF 502 is shown, which are space 1 ms+/− offset space, like indicated by 504. An N-cycle of SOF 506 is shown. A plurality of RX clock signals 508, and a total number 510 of RX clock cycle, amounting to a period of time T0, are shown. A constant offset F0 (based on USB SOF interval) may be computed as follows:

$$F0 = T0/N.$$

Figure 6:
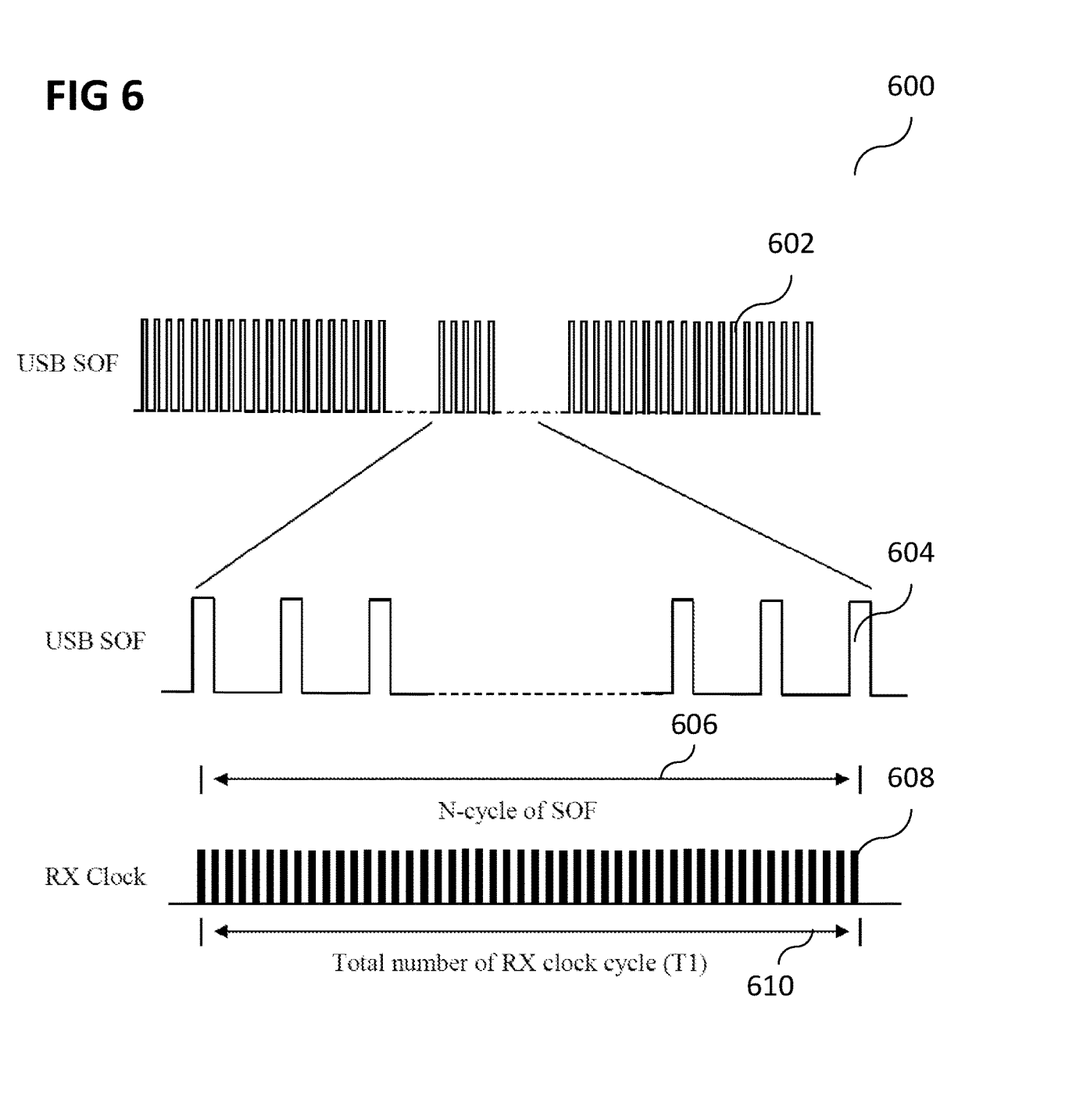
FIG. 6 shows an illustration of tracking the long term frequency drift of the computer clock according to various embodiments.

FIG. 6 shows an illustration 600 of tracking the long term frequency drift of the computer clock according to various embodiments. A plurality of USB SOF 602, and an enlarged view of USB SOF 604 of an N-cycle 606 of SOF are shown. A plurality of RX clock signals 608, and a total number 610 of RX clock cycle, amounting to a period of time T1, are shown. An average USB SOF interval F1 may be computed as follows:

$$F1 = T1/N.$$

An average frequency drift s may be computed as follows:

$$s = |F0 - F1|.$$

Figure 7:
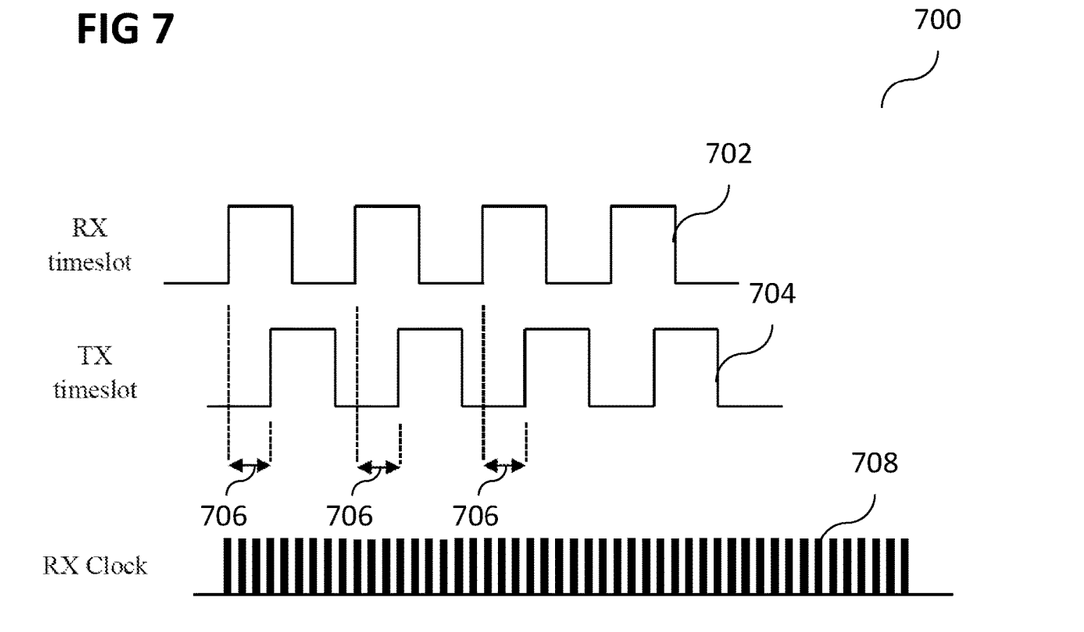
FIG. 7 shows an illustration of track the long term frequency drift of the transmitter clock according to various embodiments.

FIG. 7 shows an illustration 700 of track the long term frequency drift of the transmitter clock according to various embodiments. According to various embodiments, the offset 706 between the RX timeslot 702 and the TX timeslot 704 may be tracked. A plurality of RX clock signals 708 is shown.

According to various embodiments, the USB dongle may compute the delta between the USB clock and the dongle clock, and may send this delta to the mouse to set its operating clock. The dongle may track the USB clock and may simultaneously track the mouse clock against its own clock. The dongle may send an adjustment factor to the mouse when the delta is greater than a predefined threshold.

Various embodiments may provide a low power design, as the tracking process is performed in USB dongle which is powered by the PC. The mouse (which may act as a passive device) may merely need to adjust its clock when it is told to do so.

Various embodiments may provide high accuracy, as the USB dongle (as a centralized device) may track the clock frequency difference between the PC clock and the mouse clock.

According to various embodiments, the mouse does not need to track the clock of the (USB) dongle and the host. The tracking process may be performed in the (USB) dongle, which may draw power from the PC host. Various embodiments may provide a low power design (for example for battery powered devices), as the power consumption in the (cordless) device (for example the mouse) is minimized.

According to various embodiments, a true 1000 Hz polling rate may be achieved for a cordless mouse synchronized to a computer clock.

Various embodiments provide a power efficient tracking method as the tracking process is performed by the receiver which draws power from a computer USB port. In other words: power in a cordless mouse (in other words: wireless mouse) may be saved.

According to various embodiments, the overflow/underflow problem may be eliminated without dropping/adding any data sample.

According to various embodiments, a wireless tracking mouse system may be provided.

The following examples pertain to further embodiments.

Example 1 is an interface device comprising: an interface to a host computer; a wireless interface to a peripheral device; a difference determination circuit configured to determine a difference between timeslots in the host computer and time slots in the peripheral device; and a notification circuit configured to notify the peripheral device about the difference if the determined difference is larger than a pre-determined threshold.

In example 2, the subject-matter of example 1 can optionally include that the interface comprises a universal serial bus interface.

In example 3, the subject-matter of any one of examples 1 to 2 can optionally include that the difference determination circuit is further configured to determine the difference upon a power up of the interface device.

In example 4, the subject-matter of any one of examples 1 to 3 can optionally include that the notification circuit is configured to notify the peripheral device about the difference upon a power up of the interface device.

In example 5, the subject-matter of any one of examples 1 to 4 can optionally include that the pre-determined threshold is based on the timeslots in the host computer.

In example 6, the subject-matter of any one of examples 1 to 5 can optionally include that the pre-determined threshold is based on the timeslots in the peripheral device.

In example 7, the subject-matter of any one of examples 1 to 6 can optionally include that the pre-determined threshold is in a range of 10 ppm to 50 ppm.

In example 8, the subject-matter of any one of examples 1 to 7 can optionally include that the difference determination circuit is configured to determine the difference based on a start of frame signal.

In example 9, the subject-matter of any one of examples 1 to 8 can optionally include that the interface device comprises a universal serial bus dongle.

In example 10, the subject-matter of any one of examples 1 to 9 can optionally include that the peripheral device comprises a cordless mouse.

Example 11 is a method for controlling an interface device, the method comprising: providing an interface to a host computer; providing a wireless interface to a peripheral device; determining a difference between timeslots in the host computer and time slots in the peripheral device; and notifying the peripheral device about the difference if the determined difference is larger than a pre-determined threshold.

In example 12, the subject-matter of example 11 can optionally include that the interface comprises a universal serial bus interface.

In example 13, the subject-matter of any one of examples 11 to 12 can optionally include that the difference is determined upon a power up of the interface device.

In example 14, the subject-matter of any one of examples 11 to 13 can optionally include notifying the peripheral device about the difference upon a power up of the interface device.

In example 15, the subject-matter of any one of examples 11 to 14 can optionally include that the pre-determined threshold is based on the timeslots in the host computer.

In example 16, the subject-matter of any one of examples 11 to 15 can optionally include that the pre-determined threshold is based on the timeslots in the peripheral device.

In example 17, the subject-matter of any one of examples 11 to 16 can optionally include that the pre-determined threshold is in a range of 10 ppm to 50 ppm.

In example 18, the subject-matter of any one of examples 11 to 17 can optionally include that the difference is determined based on a start of frame signal.

In example 19, the subject-matter of any one of examples 11 to 18 can optionally include that the interface device comprises a universal serial bus dongle.

In example 20, the subject-matter of any one of examples 11 to 19 can optionally include that the peripheral device comprises a cordless mouse.

Example 21 is a computer-readable medium comprising instructions which, when executed by a computer, make the computer perform a method for controlling an interface device, the method comprising: providing an interface to a host computer; providing a wireless interface to a peripheral device; determining a difference between timeslots in the host computer and time slots in the peripheral device; and notifying the peripheral device about the difference if the determined difference is larger than a pre-determined threshold.

In example 22, the subject-matter of example 21 can optionally include that the interface comprises a universal serial bus interface.

In example 23, the subject-matter of any one of examples 21 to 22 can optionally include that the difference is determined upon a power up of the interface device.

In example 24, the subject-matter of any one of examples 21 to 23 can optionally include instructions which, when executed by a computer, make the computer perform: notifying the peripheral device about the difference upon a power up of the interface device.

In example 25, the subject-matter of any one of examples 21 to 24 can optionally include that the pre-determined threshold is based on the timeslots in the host computer.

In example 26, the subject-matter of any one of examples 21 to 25 can optionally include that the pre-determined threshold is based on the timeslots in the peripheral device.

In example 27, the subject-matter of any one of examples 21 to 26 can optionally include that the pre-determined threshold is in a range of 10 ppm to 50 ppm.

In example 28, the subject-matter of any one of examples 21 to 27 can optionally include that the difference is determined based on a start of frame signal.

In example 29, the subject-matter of any one of examples 21 to 28 can optionally include that the interface device comprises a universal serial bus dongle.

In example 30, the subject-matter of any one of examples 21 to 29 can optionally include that the peripheral device comprises a cordless mouse.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An interface device comprising:
   an interface to a host computer;
   a wireless interface to a peripheral device;
   a difference determination circuit configured to:
      determine a first clock offset between the host computer and the interface device,
      determine a frequency drift based on a clock of the host computer and a clock of the interface device,
      determine a second clock offset between the interface device and the peripheral device, and
      determine a difference between timeslots in the host computer and timeslots in the peripheral device; and
   a notification circuit configured to:
      send a first offset factor based on the first clock offset, between the host computer and the interface device, to the peripheral device,
      send a second offset factor based on both the frequency drift, based on the clock of the host computer and the clock of the interface device, and the second clock offset, between the interface device and the peripheral device, to the peripheral device, and
      notify the peripheral device about the determined difference if the determined difference is larger than a pre-determined threshold.

2. The interface device of claim 1, wherein the interface comprises a universal serial bus interface.

3. The interface device of claim 1, wherein the difference determination circuit is further configured to determine the difference upon a power up of the interface device.

4. The interface device of claim 1, wherein the notification circuit is configured to notify the peripheral device about the difference upon a power up of the interface device.

5. The interface device of claim 1, wherein the pre-determined threshold is based on at least one of the timeslots in the host computer and the timeslots in the peripheral device.

6. The interface device of claim 1, wherein the pre-determined threshold is in a range of 10 ppm to 50 ppm.

7. The interface device of claim 1, wherein the difference determination circuit is configured to determine the difference based on a start of frame signal.

8. The interface device of claim 1, wherein the interface device comprises a universal serial bus dongle.

9. The interface device of claim 1, wherein the peripheral device comprises a cordless mouse.

10. A method for controlling an interface device, the method comprising:
    providing an interface to a host computer;
    providing a wireless interface to a peripheral device;
    determining a first clock offset between the host computer and the interface device;
    determine a frequency drift based on a clock of the host computer and a clock of the interface device;
    determining a second clock offset between the interface device and the peripheral device;
    determining a difference between timeslots in the host computer and timeslots in the peripheral device; and
    sending a first offset factor based on the first clock offset, between the host computer and the interface device, to the peripheral device;
    sending a second offset factor based on both the frequency drift, based on the clock of the host computer and the clock of the interface device, and the second clock offset, between the interface device and the peripheral device, to the peripheral device; and
    notifying the peripheral device about the determined difference if the determined difference is larger than a pre-determined threshold.

11. The method of claim 10, wherein the difference is determined upon a power up of the interface device.

12. The method of claim 10, further comprising:
notifying the peripheral device about the difference upon a power up of the interface device.

13. The method of claim 10, wherein the pre-determined threshold is based on at least one of the timeslots in the host computer and the timeslots in the peripheral device.

14. The method of claim 10, wherein the difference is determined based on a start of frame signal.

15. A non-transitory computer-readable medium comprising instructions which, when executed by a computer, make the computer perform a method for controlling an interface device, the method comprising:
providing an interface to a host computer;
providing a wireless interface to a peripheral device;
determining a first clock offset between the host computer and the interface device;
determine a frequency drift based on a clock of the host computer and a clock of the interface device;
determining a second clock offset between the interface device and the peripheral device;
determining a difference between timeslots in the host computer and timeslots in the peripheral device; and
sending a first offset factor based on the first clock offset, between the host computer and the interface device, to the peripheral device;
sending a second offset factor based on both the frequency drift, based on the clock of the host computer and the clock of the interface device, and the second clock offset, between the interface device and the peripheral device, to the peripheral device; and
notifying the peripheral device about the determined difference if the determined difference is larger than a pre-determined threshold.

16. The non-transitory computer-readable medium of claim 15, wherein the interface comprises a universal serial bus interface.

17. The non-transitory computer-readable medium of claim 15, wherein the difference is determined upon a power up of the interface device.

18. The non-transitory computer-readable medium of claim 15, further comprising instructions which, when executed by a computer, make the computer perform:
notifying the peripheral device about the difference upon a power up of the interface device.

19. The non-transitory computer-readable medium of claim 15, wherein the pre-determined threshold is based on at least one of the timeslots in the host computer and the timeslots in the peripheral device.

20. The non-transitory computer-readable medium of claim 15, wherein the difference is determined based on a start of frame signal.

* * * * *